I. W. HEYSINGER.
Assignor to THE PHILADELPHIA NOVELTY MANUFACTURING COMPANY.
HAIR CRIMPER.
No. 10,936. Reissued June 5, 1888.
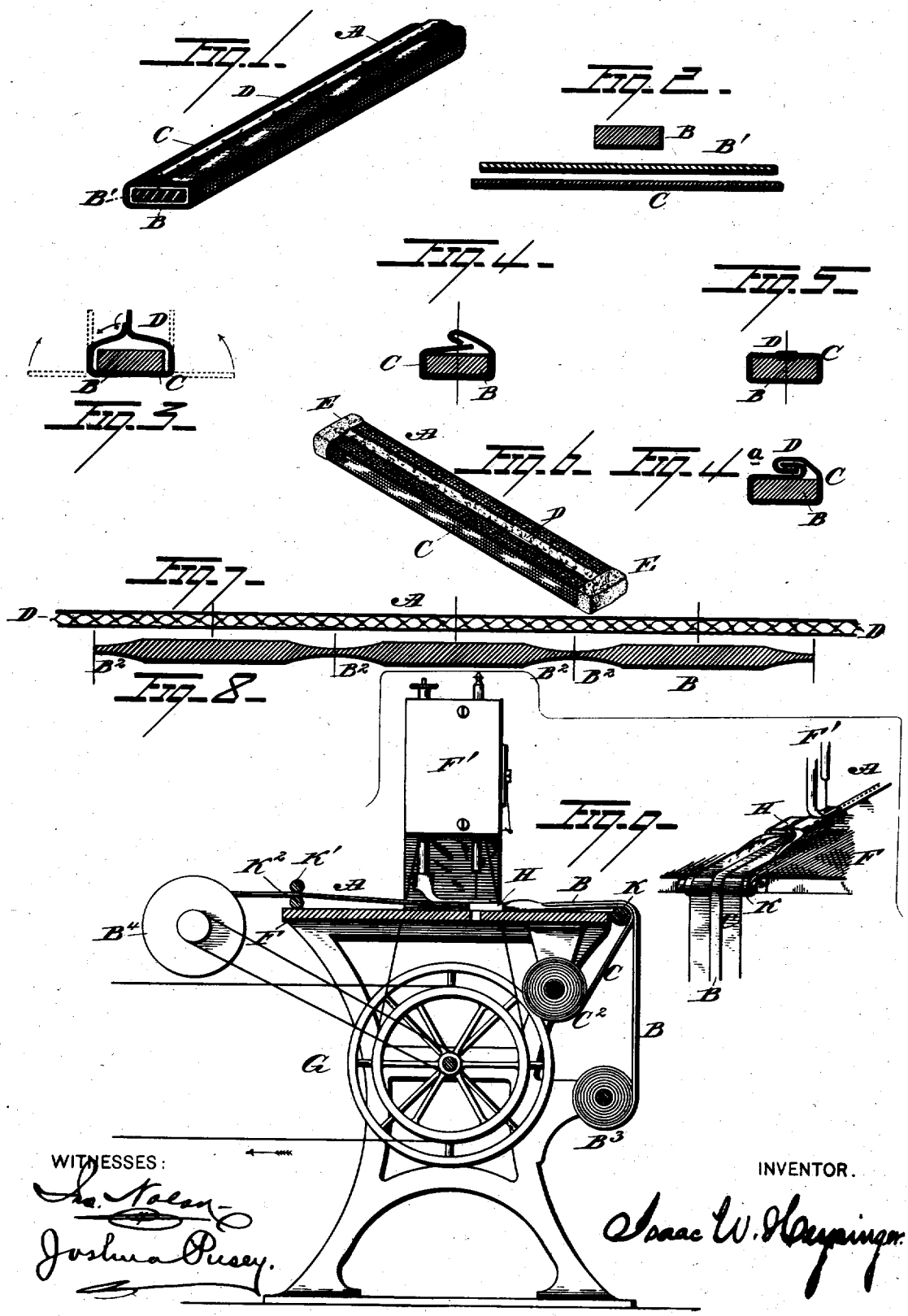
WITNESSES:
Jos. Nolan
Joshua Pusey.
INVENTOR.
Isaac W. Heysinger.

UNITED STATES PATENT OFFICE.

ISAAC W. HEYSINGER, OF PHILADELPHIA, PENNSYLVANIA, ASSIGNOR TO THE PHILADELPHIA NOVELTY MANUFACTURING COMPANY, OF SAME PLACE.

HAIR-CRIMPER.

SPECIFICATION forming part of Reissued Letters Patent No. 10,936, dated June 5, 1888, Original No. 309,854, dated December 30, 1884. Application for reissue filed March 20 1888. Serial No. 267,909.

*To all whom it may concern:*

Be it known that I, ISAAC W. HEYSINGER, of Philadelphia, in the county of Philadelphia and State of Pennsylvania, have invented certain new and useful Improvements in Hair-Crimpers and in the Manufacture thereof, of which the following is a full, clear, and exact description, reference being had to the drawings accompanying and forming a part of this specification, in which—

Figure 1 is a perspective view of a hair-crimper partially embodying my invention, showing the soft-metal core, the interposed reenforcing strip, the textile or woven covering, and the longitudinal seam by which the said covering is secured, no cement having been used. Fig. 2 shows a core of soft metal in which the metallic wrapping, which is turned over to form the seam, is made of a separate sheet-metal strip, the textile or woven fabric being applied and folded therewith. Fig. 3 shows the various steps by which the textile or woven fabric is laid around the soft-metal core. Fig. 4 shows the core, the covering fabric, and the completed seam before rolling in cross-section. Fig. 4ª is a modification in which a double fold is taken along the edges of the fabric, when the latter is made self-sustaining and no stitching is used before rolling down. Fig. 5 shows the seam as rolled down flat upon the core to secure the same. Fig. 6 is a side view of the flat surface of a hair-crimper partially embodying my invention, in which the surface of the fabric covering the core has been rolled under embossing or figured rolls to give the said surface a pebbled or other ornamental finish, and in which, also, the ends of the crimper have been dipped in cement to prevent the unraveling of the ends of the covering thereof. Fig. 7 is a longitudinal section of a length of hair-crimper stuff before cutting the same into crimpers, and shows the stitches by which the seam is fastened to the core. Fig. 8 shows a plan view of length of core to be afterward covered with textile or woven fabric and cut into crimpers upon the cross-lines shown in the figure, in which the said core is of various diameters, so as to form the finished crimpers with ends thinner and more flexible than the central portion or body of said crimpers. Fig. 9 shows the method by which a sewing-machine is adapted to produce a hair-crimper embodying my invention.

The lettering in all the figures is uniform.

My invention relates to the construction of a hair-crimper provided with a core of soft metal surrounded with a covering of textile or woven fabric and adapted to be used for crimping the hair of children, ladies, or others by winding separate strands of the hair around the said crimper and afterward turning in the ends so as to clasp and hold the hair until it has become set in its new twisted direction, in which said hair-crimper the covering fabric is cut into strips of a suitable width in the process of manufacture and wrapped around the core, so as to form a sheath or envelope for the same, and fastened by a row of stitches running longitudinally through the center of the crimper and passing through the core, so as to make a secure seam, and also prevent the covering from stripping off the core longitudinally into whatever length the crimper may be cut, whereby the use of cement or metallic caps, or other similar attaching means which have heretofore been used for such purposes, are dispensed with and a cheaper and stronger crimper is made than those in ordinary use; and also, as hereinafter described, and fully set forth in the specification of my Patent No. 309,854, of which this is a reissue, to a similar flat metal hair-crimper or length of hair-crimper stock in which no stitches are used, the textile covering made self-sustaining, the edges of the flat metal core doubled over at the sides, so as to overlap and retain the edges of the covering-strip and form a continuous seam along the middle line, said stock passed under compressing-rolls and subsequently cut up into crimpers; and to a continuously-braided soft-metal crimper, as hereinafter described, in which the braided covering is attached to the soft-metal core by a row of stitches passing through the same; and to a soft-metal hair-crimper formed with swells and contractions upon the metal core thereof and provided with a textile covering; and also to a hair-crimper, as hereinafter described, and fully set forth in my original specification of said patent, having a core of soft-metal wire and a covering of fabric and an interposed re-enforcing strip laid between the said wire and the said covering, and attached thereto from end to end to produce a softer and bulkier crimper of greater flexibility and durability when a single core and a single wrap are used; and also to a hair-crimper or a length of stock to be divided into hair-crimpers composed of a ductile inelastic core of soft-metal wire and a non-metallic covering attached thereto, in which the surfaces thereof are rolled under embossing or figured rolls to give the said surface a pebbled, figured, or embossed finish to assist in holding the hair, or in which the surfaces of said crimpers are by other means artificially roughened, figured, or embossed, as described.

My invention also relates to the method of manufacture of said crimpers, as will be described hereinafter.

Referring to the drawings, A is a hair-crimper, adapted to be used as above described, consisting of a central core, B, of soft metal, preferably lead. This core I form from a continuous length of lead wire, such as is commonly manufactured at lead-pipe works. If made rectangular or flat in cross-section, it may be used as delivered from the die; but if of round sectional form, it should be flattened between suitable rolls.

It is well known in the art that soft metal, when drawn or forced into the form of a continuous wire through suitable dies, is capable of being made much more ductile from having its grain or fiber laid along its length by this process than if cut into strips from a sheet of thin metal, and the increased ductility thus secured for my lead wire renders it possible for me, without making it brittle, to double it at the sides by folding its edges over, so as to overlap and retain the edges of the covering-strip, as will be hereinafter described, when no stitches are used. By this method of manufacture I am enabled to produce a laterally overlapped or folded metal core which has far more ductility to resist, without breaking, the frequent flexions to which it is subjected, than if cut from sheet metal in strips of a suitable width, and in far greater continuous lengths and at a less cost. While I sometimes use other soft metals—such as iron, copper, or soft brass—I prefer to use a lead wire, which is forced through a die by pressure, as the lead requires no annealing, gives a larger body to the crimper in proportion to its flexibility than the other metals named, and is entirely free from elasticity, which is an important feature in practical use. I provide a strip of textile or woven fabric—such as muslin, linen, silk, stockinet, gum-cloth, or other like material—of such width that it may surround the core, leaving a free edge to be turned over and inward to form a seam, D, upon the top surface of the length of crimper. To furnish these strips of uniform width and with economy, I take a piece of the goods to be used from fifty to a hundred yards in length, and wind the same tightly upon a roll rotated by a handle or pulley. When the roll is completed, I fasten down the free edge thereof across the roll with paste or glue, and then remove the said roll from the rod upon which it has been wound. After drying the cemented edge, I place the roll endwise in a paper-cutter, such as is used by printers, the width of each cut being properly graduated by a gage, and cut off wheels of the fabric of the proper width. I place each wheel $C^2$ in a vertical case, in which it is adapted to rotate, or place it upon an axle beneath a sewing-machine table, F, Fig. 9, and loosening the pasted edge I draw it upward over a roller, K, at the edge of the machine-table, and so forward through a flat channel, H, the sides of which are gradually turned upward and then turned toward each other, and finally turned in to the proper degree, somewhat as in a sewing-machine hemmer, so that the strip is delivered under the needle in the form of a hollow case or tube with a folded upper side. Just where the strip of fabric passes the edge of the sewing-machine table and the roller K the core joins it and afterward travels with it. The spool $B^3$, from which the lead core is unwound, is so placed as to deliver the core along the center line of the strip, which is thus folded around it and seamed above it, as shown in Fig. 9. The folded material then passes beneath the needle, being fed either by the sewing-machine feed or by a special feed, and is stitched with a lock-stitch by the jointly-acting needle and shuttle through the fold, the lead core, and the covering beneath. It then passes onward, and I prefer to pass it between the compressing-rolls $K' K^2$, which close down the burrs made by the needle passing through the lead core, and compress the lead around the stitches, so as to more securely hold the same, and at the same time, by their suitably-roughened surfaces, figure or emboss the surface of the crimper-stuff, which may also be figured or otherwise ornamented by a separate pair of rolls or other means, if desired. It is then wound upon the reel $B^4$, which receives its motion from the sewing-machine by a slipping belt, so that it keeps the stuff between the needle and the reel $B^4$ at the proper tension. The material thus wound upon the reel $B^4$ accumulates until the reel is full, when the reel is removed and an empty one substituted.

While I describe the above operations as being performed on an ordinary sewing-machine, I only do so for the purpose of more clearly illustrating the method of manufacture, and I do not confine myself to the use of a sewing-machine or claim the same as a part of my invention in this application. After the completion of the roll above described, it is fed from the reel into a suitable cutting-machine, whereby it is cut into suitable lengths for hair-crimpers, or may be left in longer pieces to be cut off from time to time, as desired.

In order to prevent the ends of the crimpers from unraveling or the threads of the stitches from drawing out, I sometimes seal the ends, as shown in Fig. 6, by dipping them, as ordinary lucifer matches are dipped, into a bath of liquid glue or cement, which I afterward dry. As these are dipped in large quantities at one operation, the process is very inexpensive and a smooth finish is given to each end. I prefer a solution of shellac for this purpose, though other cementing material may be used, if desired. I also sometimes prefer not to stitch the covering to the core, but to make the cover itself self-sustaining. For this purpose I roll out the lead wire into a core of flat wire having thin lateral edges, or use a core of metal wire, a flat re-enforcing strip of sheet lead or the like interposed between the wire and covering, and a covering of textile fabric, the re-enforcing strip and covering seamed over the central wire and attached to each other from end to end, as shown in Fig. 3, the rolls K′ K² completing the seam D, which is afterward flattened and embossed.

I do not limit my invention to any especial form of fold or seam, but use any of those known or in general use, whereby the free edges of the fabric may be turned inward under the folded edges of the metal strip, and be securely held thereby. Nor do I confine myself to the precise transverse sectional forms of the metal core shown in the figures, my invention being designed to produce a crimper by the conjoined use of the metal core and covering-strip seamed thereto and attached along its whole length, whether by the turned-in edges of the metal or the row of stitches, or other like means, substantially as described.

Sometimes I use a core of the ordinary sectional form, (see Fig. 2,) and lay a strip of sheet-lead or like flat flexible and inelastic material inside the strip of textile or woven fabric, so that both are fed and turned in over the core and seamed at the same time.

For certain purposes it is desirable to have the body of the crimper of considerable size, as for curling the hair. As this would, if the core were of uniform size throughout, make it more difficult to bend the ends inward to hold the hair inward in place, in such case I roll, cut, force, or draw the core into the form shown in Fig. 8, whereby when the crimpers are cut off, the ends are of a smaller thickness than the centers and may be readily turned inward, while the hair, which is wrapped around the middle, may be of considerable bulk.

While I show a single covering around the core, I sometimes fold the fabric twice or more around the same before stitching it down, whereby a softer and bulkier crimper is made than with a single wrap. I also sometimes lay two flat soft-metal strips upon each other to form the core, instead of a single one, whereby greater flexibility and durability are secured.

Instead of bundling the finished crimpers in dozens, I sometimes spool the stuff in lengths of one or more yards, which may be cut off into different lengths at will by the purchaser to suit his convenience. I also sometimes, instead of covering the core with a strip of fabric, braid a covering around it like hoop-skirt wire, and afterward run a row of stitches through the same to secure the covering to the core. I also sometimes wrap the strip of textile or woven material in the form of a spiral around the core, and then seam it to the core by a row of stitches running along the crimper, as described, and I also modify my invention in various other equivalent ways, such as would suggest themselves to any intelligent mechanic to meet special requirements.

Having now described my invention, what I claim, and desire to secure by Letters Patent, is—

1. As a new article of manufacture, hair-crimper stock consisting of a continuous core of soft-metal wire and a covering strip of flexible non-metallic fabric applied thereto, said core attached continuously to the said fabric, the edges of said strip seamed by a continuous seam, the said stock adapted to be cut into suitable lengths, substantially as and for the purpose described.

2. As a new article of manufacture, a flat hair-crimper composed of a ductile, non-elastic core of soft-metal wire and a covering-strip of non-metallic fabric, the edges of said fabric secured together by a continuous seam, said wire attached to said covering-strip from end to end, substantially as described.

3. In a hair-crimper, a soft-metal core consisting of a central body, B, and a flat self-sustaining strip, B′, in combination with a covering of textile fabric, substantially as and for the purpose set forth.

4. In a hair-crimper, a soft-metal core consisting of a central body, B, in combination with a flat self sustaining strip, B′, laid upon said body B and having thin lateral edges, and a textile covering, C, surrounding said interposed strip B′ and attached thereto continuously from end to end, substantially as and for the purposes set forth.

5. As a new article of manufacture, a continuous length of hair-crimper stock, consisting of a soft-metal core and a covering of flexible non-metallic fabric, said fabric being attached to said core by a longitudinally-stitched seam, said stitches passing through both the covering and the core, the said stock adapted to be cut into suitable lengths, substantially as and for the purpose described.

6. A flat metal hair-crimper having a textile or woven covering united thereto from end to end by a series of stitches in which the threads pass through both sides of the covering and through the metallic core of the said crimper, and having the sides of the needle-holes swaged down upon the threads, so that the said covering shall not strip from the said core when the said crimper is cut into various lengths, substantially as described.

7. In a hair-crimper, a soft-metal wire having the length thereof provided with swells and contractions B $B^2$, so that the body of the crimper may be of a different diameter from the ends thereof, in combination with a textile covering, C, attached to said wire continuously from end to end, substantially as described.

ISAAC W. HEYSINGER.

Witnesses:
JNO. NOLAN,
P. O'DONNELL.